United States Patent Office 2,979,493
Patented Apr. 11, 1961

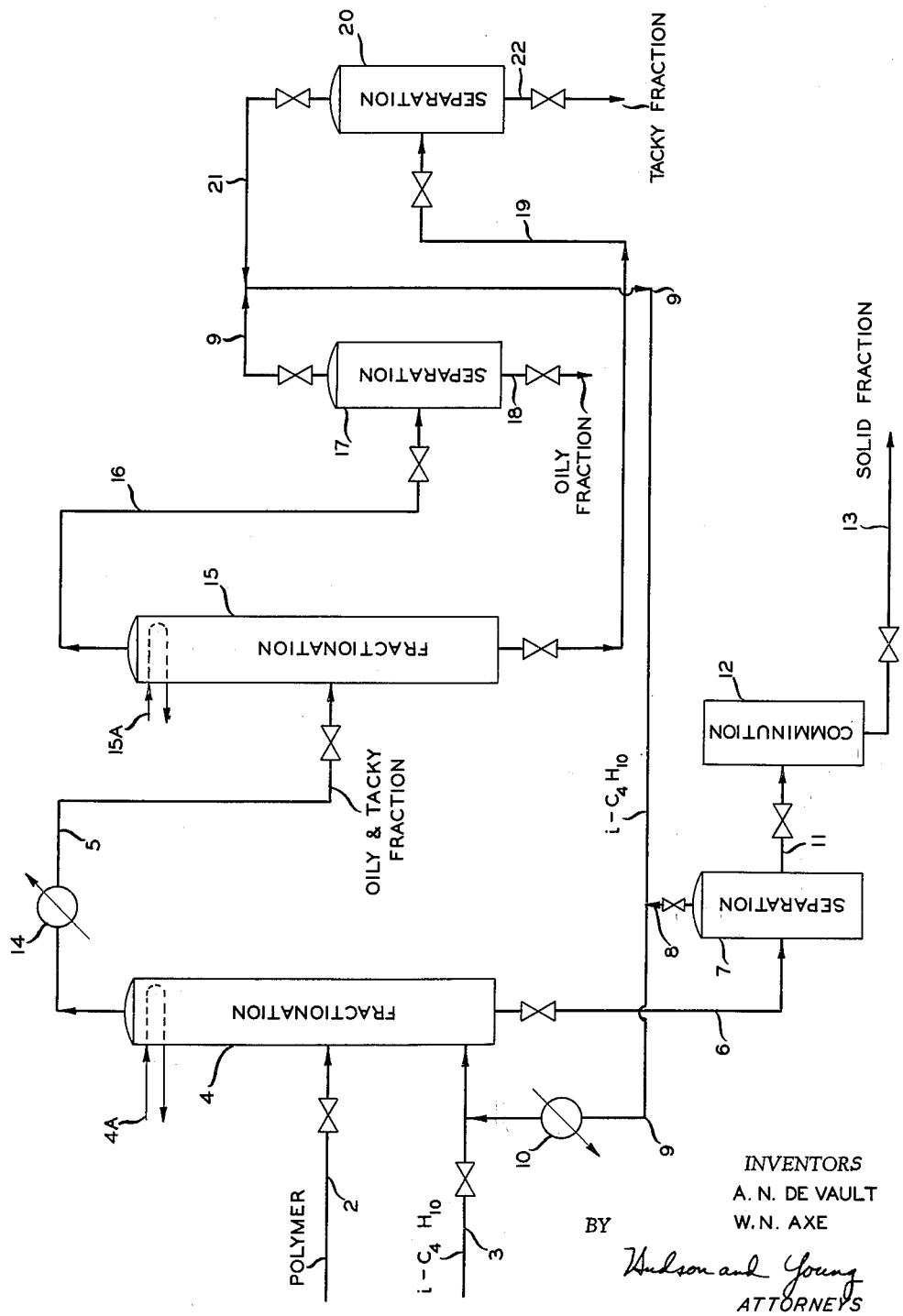

2,979,493

FRACTIONATION OF POLYMERS

William N. Axe and Albert N. De Vault, Bartlesville, Okla., assignors to Phillips Petroleum Company, a corporation of Delaware Filed Mar. 10, 1958, Ser. No. 720,207

8 Claims. (Cl. 260—93.7)

This invention relates to a process for fractionating polymers. In one aspect it relates to a novel solvent fractionation process. In another aspect it relates to a process for fractionating high polymers composed of fractions having different properties and uses.

This application is a continuation-in-part of Serial No. 459,732, filed October 1, 1954, now Patent No. 2,845,410.

The copending application of J. P. Hogan and R. L. Banks, Serial No. 573,877, filed March 26, 1956, now U.S. Patent 2,825,721, a continuation-in-part of Serial No. 476,306, filed December 20, 1954, now abandoned, a continuation-in-part of Serial No. 333,576, filed January 27, 1953, now abandoned, discloses a class of unique polymers and a method for preparing these polymers. Briefly, the process comprises contacting a 1-olefin having a maximum chain length of 8 carbon atoms and no chain branching nearer the double bond than the 4-position with a catalyst comprising chromium oxide containing hexavalent chromium associated with at least one other oxide, silica, alumina, zirconia or thoria, particularly silica and/or alumina. When the olefin to be polymerized is ethylene, the preferred polymerization temperature is in the range 275 to 375° F. when the catalyst is used in the form of a fixed bed and 200 to 350° F. when a mobile catalyst is used. When the olefin to be polymerized is propylene or a heavier olefin, a temperature in the range 150 to 250° F. is ordinarily used. The process is operable, however, over a broader range, but usually within the range 150 to 450° F. When the olefin to be polymerized is propylene or a higher-boiling olefin, the product polymer, which includes all products produced by polymerization of the feed olefin, can be separated into three fractions: an oily fraction having a maximum boiling point in the range 850 to 900° F., and usually a boiling range of about 400 to 900° F., and a molecular weight in the range 200 to 500; a normally tacky fraction boiling above 900° F. and having a molecular weight in the range 500 to 5000; and a normally solid fraction having a molecular weight in excess of 5000, e.g. 5000 to 30,000 when propylene is the feed olefin. When propylene is polymerized, the solid fraction of the polymer has a melting point in the range 240 to 300° F., a density in the range 0.90 to 0.95, and an intrinsic viscosity in the range 0.2 to 1.0, as measured with a solution of the polymer in tetralin. The oily fraction of the polymer is useful as a lubricating oil or a lubricating oil additive, particularly as a viscosity index improver. The tacky fraction can be used as an adhesive or a component of adhesive compositions, for example, in the preparation of adhesive tapes, insulation, and laminated compositions. The solid polymer fraction can be used to form molded articles, can be extruded to form pipe and tubing and can be used as a component of protective coating compositions.

In view of the foregoing, it is clear that a method for the ready separation of the above fractions of the polymer is desirable. It is further desirable that the method utilize relatively inexpensive materials and that it be readily adaptable to large-scale, continuous operation. This invention provides such a separation method and utilizes the principle of solvent fractionation wherein the fractionating action of a relatively low-boiling hydrocarbon solvent is utilized. As compared with distillation methods, this invention has the advantage of relatively low-temperature operation.

According to this invention, a polymer which can be resolved into a viscous oily fraction, a tacky fraction, and a normally solid fraction is resolved into its components by contacting with a hydrocarbon solvent having from 3 to 4 carbon atoms per molecule under such conditions that the lighter phase contains both the oily fraction and the tacky fraction and the heavier phase contains the normally solid fraction, which is recovered therefrom. The lighter phase is then subjected to conditions adapted to change its density, namely increased temperature, so that the tacky fraction separates as a separate phase. After the second phase separation, the oily fraction is recovered from the lighter phase and the tacky fraction from the heavier phase.

The hydrocarbon utilized as the fractionating solvent in the first step of this invention can be propane, propylene, isobutane, normal butane, a normal butylene, or isobutylene. Ordinarily, a paraffinic hydrocarbon is preferred on account of its relative chemical inertness and lower cost. A further preferred solvent is isobutane because it has optimum solvent power for the desired separation.

The temperature conditions utilized in each step will depend upon the particular solvent used and the particular separation desired. The temperatures in general can be within a range the lower limit of which is defined by the cloud point, i.e. the temperature at which particles of solid appear in the solvent-rich phase (ordinarily about 200° F.) and the upper limit of which is the temperature at which the polymer begins to decompose. Usually it is desirable to maintain a temperature differential between the two treating steps of between about 10 and about 50° F.; however, either higher or lower differentials can be used as desired in providing the desired separation of the polymer fractions. Although temperatures above the critical temperature of the solvent can be used, as a practical matter, it is preferable to use a temperature not greater than the critical temperature of the solvent, since a greater solvent power and lower pressure accompany temperatures below the critical. A pressure sufficient to maintain the solvent substantially in the liquid phase is desired. The ratio of solvent to polymer is generally in the range 5:1 to 40:1.

In order to more clearly describe the invention and provide a better understanding thereof reference is had to the accompanying drawing which is a diagrammatic illustration of a fractionation and separation system suitable for carrying out the invention.

As illustrated in Figure 1, a polymer of the type described enters fractionation zone 4 through inlet 2. Isobutane, or other $C_3$ or $C_4$ hydrocarbon, enters fractionation zone 4 through inlet 3. Although fractionation zone 4 can comprise one or more single-stage contactors, such as a pressure tank equipped with a stirring device and connected to a settling tank, it is preferred that a countercurrent contacting device such as a column be utilized. In this type of equipment, the polymer and the liquid isobutane countercurrently contact each other in the lower part of the column, the polymer entering at an intermediate level and the isobutane at a lower level. A temperature gradient is maintained between the top and the bottom of the column, as for example, by the use of steam coil 4A. Thus the bottom of the column can be maintained at approximately 220° F. and the top at approximately 240° F. Since the critical temperature of isobutane is approximately 275° F. and the critical pressure is approximately 529 p.s.i.a., these values represent preferred upper limits for the temperature and pressure in fractionation zone 4. When the fractionation zone is operated in the range 220 to 240 F., a gauge pressure of about 450 p.s.i. is satisfactory for the maintenance of liquid-phase conditions.

Under the conditions set forth, two liquid phases form, the lighter of which is composed of isobutane, the oily fraction, and the tacky fraction, and the heavier of which is the normally solid fraction with relatively small amounts of isobutane. The lighter fraction is withdrawn through conduit 5. The heavier fraction is withdrawn through conduit 6 and passes to separation zone 7, in which the isobutane is recovered and recycled through conduits 8 and 9 and condenser 10. The normally solid fraction is passed through conduit 11 to comminution zone 12, which can be any known apparatus for the production of plastic materials in the form of cylindrical segments, granules, flakes, spheres, pellets, or other form which facilitates handling of the solid material prior to the fabrication or formulation thereof into a desired article or composition. The comminuted solid fraction is recovered through outlet 13.

The lighter phase is passed through conduit 5 and heat exchanger 14, wherein the temperature is raised, and enters fractionation zone 15, wherein the temperature is higher than in fractionation zone 4 and a temperature gradient is maintained by the use of steam coil 15A. Additional isobutane and/or a lighter hydrocarbon can be added, e.g. at the bottom of the column, through means not shown. Fractionation zone 15 is maintained at a temperature in the range of 250 to 270° F. and a pressure of approximately 520 p.s.i. A light phase comprising isobutane and oily fraction is removed through conduit 16, and a heavier phase comprising mainly the tacky fraction with small amounts of isobutane is removed through conduit 19. The light phase is fractionated in separation zone 17 to recover isobutane, which is recycled through conduit 9, and oily fraction which is recovered through outlet 18.

The heavier phase passes through conduit 19 to separation zone 20, from which isobutane is recovered through conduit 21 and recycled through conduit 9 and tacky fraction is recovered through outlet 22.

*Example*

A propylene polymer is produced by contacting a 2 weight percent solution of propylene in isooctane at a temperature of 190° F. and a pressure of approximately 450 p.s.i. with a catalyst prepared by impregnating a 90 weight percent silica–10 weight percent alumina coprecipitated composite with an aqueous solution of chromic acid, followed by drying and heating at 950° F. in a stream of anhydrous air for 5 hours. The resulting catalyst contains 2.5 weight percent chromium in the form of chromium oxide, part of the chromium being in the hexavalent form. The effluent from the reaction zone is fractionated to remove the isooctane and recover a polymeric product.

This product is passed into the mid-point of a vertical cylindrical column having staggered horizontal baffles at the rate of approximately 100 volumes per hour. Isobutane is passed, in the liquid phase, into the bottom of the column at the rate of 2000 volumes per hour. The bottom of the column is maintained at a temperature of 220° F. and the top at 240° F. The bottom product from the column is passed to a flash zone from which 15 volumes per hour of molten normally solid polymer are obtained. This polymer has a freezing point of 251° F. and a molecular weight of approximately 10,000. It can be used for the fabrication of molded containers.

The overhead or extract fraction from the column comprises approximately 1,985 volumes per hour of isobutane and 85 volumes of polymer. It is passed to a second column similar to the first column. The bottom temperature of the second column is 250° F. and the top temperature is 270° F. From the top of the column is withdrawn a mixture of 3,470 parts of isobutane and 70 parts by volume of oily polymer, additional isobutane having been added at the base of the second column. The bottom fraction from the second column comprises 15 volumes of isobutane and 15 volumes of tacky polymer per hour.

The oily polymer, which has a boiling range of 415 to 896° F. and a molecular weight of 450, is useful as a VI improper for lubricating oils. The tacky polymer is used as an adhesive component for insulating tape, and has a molecular weight of 3800.

In other specific embodiments, polymers of 1-butene, of 1-pentene, and of 4-methyl-1-pentene, produced in the presence of a chromium oxide catalyst substantially as described in the foregoing run with propylene, can be fractionated as described in the run with polypropylene.

From the foregoing it will be seen that this invention provides a process whereby a polymer containing, for example, three fractions having different properties and uses can be resolved into said fractions by a first-stage solvent fractionation which produces one of said fractions separate from the others and by further separating the other fractions from each other in a second-stage solvent fractionation under conditions such that the fractionating solvent has a density different from that utilized in the first stage. While certain process steps, structures and examples have been described for purposes of illustration, it is clear that the invention is not limited thereto. Although the invention is generally applicable to any polymer which can be resolved into fractions having different properties, it is particularly applicable to olefin polymers of the type described in the cited application of Hogan and Banks. While the process is applicable to polyethylenes of the type described in said application, it is more frequently applied to polymers of propylene and heavier olefins, since polyethylene produced by the process of the cited application ordinarily contains only small amounts of fractions other than a normally solid fraction. While the invention has been described chiefly with respect to a propylene polymer, other 1-olefins such as 1-hexene, 1-butene, 1-octene and 1-pentene produce polymers which are fractionatable according to the process of this invention.

The molecular weights discussed herein are obtained according to the equation $$M = \frac{4.03 \times 10^3 \times N_i \times 14}{2.303}$$

wherein M is the molecular weight and $N_i$ is the intrinsic viscosity as determined for a solution of 0.2 gm. of polymer in 50 cc. of tetralin at 130° C.

We claim:

1. A process for fractionating a polymer which is the total polymer prepared by polymerizing an aliphatic 1-olefin having a maximum chain length of 8 carbon atoms and no branching nearer the double bond than the 4-position in the presence of a catalyst containing hexavalent chromium as chormium oxide and at least one oxide selected from the group consisting of silica, alumina, zirconia, and thoria, said total polymer being resolvable into a low molecular weight viscous oily fraction, a higher molecular weight tacky fraction, and a still higher molecular weight normally solid fraction which comprises dissolving said total polymer in a solvent hydrocarbon having from 3 to 4 carbon atoms per molecule, heating the solution of polymer and solvent to a first temperature until there is formed a lighter liquid first phase and a heavier liquid second phase in a first separation zone while maintaining a temperature differential in said zone, separately accumulating said first and second phases in different sections of said first separation zone, heating said lighter liquid first phase to a second temperature higher than said first temperature until there is formed a still lighter liquid third phase and a fourth liquid phase of intermediate density in a second separation zone while maintaining a temperature differential in said second zone, separately accumulating said third and fourth phases in different sections of said second separation zone, recovering normally solid polymer from said second phase, recovering tacky polymer from said fourth phase, and recovering oily polymer from said third phase.

2. The process of claim 1 wherein said solvent hydrocarbon is isobutane, said first temperature is in the range of 220 to 240° F., and said second temperature is in the range of 250 to 270° F.

3. A process according to claim 1 wherein each of said zones is a countercurrent contacting zone and the top of each zone is maintained at a higher temperature than the bottom of said zone.

4. A process according to claim 1 in which the solvent hydrocarbon is isobutane.

5. A process according to claim 1 in which the solvent hydrocarbon is propane.

6. A process for fractionating polypropylene having a low molecular weight viscous oily fraction boiling below 900° F., a higher molecular weight normally tacky fraction boiling above 900° F., and a still higher molecular weight normally solid fraction having a melting point in the range of 240 to 300° F. which comprises dissolving said polypropylene in isobutane, heating the solution of polypropylene and isobutane to a first temperature in the range 220 to 240° F. until there is formed a lighter liquid first phase and a heavier liquid second phase in a first separation zone while maintaining a temperature differential in said zone, separately accumulating said first and second phases in different sections of said first separation zone, heating said lighter liquid first phase to a second temperature in the range 250 to 270° F. until there is formed a still lighter liquid third phase and a fourth liquid phase of intermediate density in a second separation zone while maintaining a temperature differential in said second zone, separately accumulating said third and fourth phases in different sections of said second separation zone, recovering normally solid polymer from said second phase, recovering tacky polymer from said fourth phase, and recovering oily polymer from said third phase.

7. A process according to claim 6 wherein each of said zones is a countercurrent contacting zone and the top of each zone is maintained at a higher temperature than the bottom of said zone.

8. A process for fractionating polypropylene having a low molecular weight viscous oily fraction boiling below 900° F., a higher molecular weight normally tacky fraction boiling above 900° F., and a still higher molecular weight normally solid fraction having a melting point in the range of 240 to 300° F. which comprises dissolving said polypropylene in a solvent hydrocarbon having from 3 to 4 carbon atoms per molecule, heating the solution of polypropylene and solvent to a first temperature until there is formed a lighter liquid first phase and a heavier liquid second phase in a first separation zone while maintaining a temperature differential in said zone, separately accumulating said first and second phases in different sections of said first separation zone, heating said lighter liquid first phase to a second temperature higher than said first temperature until there is formed a still lighter liquid third phase and a fourth liquid phase of intermediately density in a second separation zone while maintaining a temperature differential in said second zone, separately accumulating said third and fourth phases in different sections of said second separation zone, recovering normally solid polymer from said second phase, recovering tacky polymer from said fourth phase, and recovering oily polymer from said third phase.

References Cited in the file of this patent

UNITED STATES PATENTS

| | | |
|---|---|---|
| 2,825,721 | Hogan et al. | Mar. 4, 1958 |
| 2,837,504 | Hanson et al. | June 3, 1958 |
| 2,886,610 | Georgian | May 12, 1959 |

OTHER REFERENCES

Flory: Principles of Polymer Chemistry, Cornell University Press, Ithaca, New York (1953), pages 341 and 342.